US008517810B2

(12) United States Patent
Vann

(10) Patent No.: US 8,517,810 B2
(45) Date of Patent: Aug. 27, 2013

(54) CONTROLLING PROGRESS IN WAGERING GAMES

(75) Inventor: Jamie W. Vann, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/255,307

(22) PCT Filed: Mar. 11, 2010

(86) PCT No.: PCT/US2010/027029
§ 371 (c)(1),
(2), (4) Date: Sep. 8, 2011

(87) PCT Pub. No.: WO2010/105088
PCT Pub. Date: Sep. 16, 2010

(65) Prior Publication Data
US 2012/0004026 A1 Jan. 5, 2012

Related U.S. Application Data

(60) Provisional application No. 61/159,591, filed on Mar. 12, 2009.

(51) Int. Cl.
*G07F 17/32* (2006.01)
(52) U.S. Cl.
USPC .................................. 463/16; 463/20; 463/25
(58) Field of Classification Search
USPC .......................................... 463/31, 16, 20, 25
See application file for complete search history.

(56) References Cited

U.S. PATENT DOCUMENTS

| 5,664,998 A * | 9/1997 | Seelig et al. ................... 463/20 |
| 6,364,765 B1 | 4/2002 | Walker et al. |
| 6,592,456 B2 | 7/2003 | Walker et al. |
| 6,605,001 B1 | 8/2003 | Tarantino et al. |
| 6,612,575 B1 | 9/2003 | Cole et al. |

(Continued)

FOREIGN PATENT DOCUMENTS

| JP | 200347777 | 2/2003 |
| JP | 2007014798 | 1/2007 |

(Continued)

OTHER PUBLICATIONS

"PCT Application No. PCT/US10/27029 International Preliminary Report on Patentability", Jun. 9, 2011, 15 pages.

(Continued)

*Primary Examiner* — Omkar Deodhar
(74) *Attorney, Agent, or Firm* — DeLizio Gilliam, PLLC

(57) ABSTRACT

A wagering game system and its operations are described herein. In embodiments, the operations can include tracking progress of a wagering game player account (player account) for a persistent-state game. The player account can fulfill progression requirements for the persistent-state game, such as by performing wagering game activities. The operations can then provide, or reward, the player account with progress in the persistent-state game. Operations can mark the progress by presenting progress markers on a progress chart available to the player account. The progress chart can be based on an episodic theme. The operations can present episodic theme content at certain locations on the progress chart. The operations can further unlock content based on progress in the persistent-state game and present unlocked content to the player account. Operations can also enforce progress limits, where the player account can perform gaming activities to remove the progress limits.

26 Claims, 9 Drawing Sheets

(56) References Cited

U.S. PATENT DOCUMENTS

| | | |
|---|---|---|
| 6,692,353 B2 | 2/2004 | Walker et al. |
| 6,800,027 B2 | 10/2004 | Giobbi et al. |
| 6,843,724 B2 | 1/2005 | Walker et al. |
| 7,182,690 B2 | 2/2007 | Giobbi et al. |
| 7,713,119 B2 | 5/2010 | Pacey et al. |
| 7,785,194 B2 | 8/2010 | Schneider et al. |
| 7,811,167 B2 | 10/2010 | Giobbi et al. |
| 2006/0068893 A1 | 3/2006 | Jaffe et al. |
| 2007/0117616 A1 | 5/2007 | Bartholomew |
| 2007/0259713 A1 | 11/2007 | Fiden et al. |
| 2007/0298856 A1 | 12/2007 | Gilmore et al. |
| 2008/0200244 A1 | 8/2008 | Rowe et al. |
| 2008/0248865 A1 | 10/2008 | Tedesco et al. |
| 2008/0293473 A1 | 11/2008 | Fiden et al. |
| 2008/0293478 A1 | 11/2008 | Anderson et al. |
| 2008/0300049 A1 | 12/2008 | Anderson et al. |
| 2008/0318671 A1 | 12/2008 | Rowe et al. |
| 2009/0011824 A1 | 1/2009 | Englman et al. |
| 2009/0054136 A1 | 2/2009 | Gagner et al. |
| 2009/0156299 A1 | 6/2009 | Anderson et al. |
| 2009/0197684 A1 | 8/2009 | Arezina et al. |
| 2010/0016063 A1 | 1/2010 | Jaffe et al. |
| 2010/0016071 A1 | 1/2010 | Jaffe et al. |
| 2010/0056251 A1 | 3/2010 | Jaffe et al. |
| 2010/0203963 A1 | 8/2010 | Allen et al. |
| 2010/0240442 A1 | 9/2010 | Anderson et al. |
| 2010/0255900 A1 | 10/2010 | Ansari et al. |
| 2010/0267449 A1 | 10/2010 | Gagner et al. |
| 2010/0317424 A1 | 12/2010 | Hornik et al. |
| 2011/0021260 A1 | 1/2011 | Adiraju et al. |
| 2011/0034237 A1 | 2/2011 | Schulhof et al. |
| 2011/0045892 A1 | 2/2011 | Vann et al. |
| 2011/0045895 A1 | 2/2011 | Gagner et al. |
| 2011/0130197 A1 | 6/2011 | Bytnar et al. |

FOREIGN PATENT DOCUMENTS

| | | |
|---|---|---|
| WO | WO2006017068 | 2/2006 |
| WO | WO2006044252 | 4/2006 |
| WO | WO2007067980 | 6/2007 |
| WO | WO2007098117 | 8/2007 |
| WO | WO2007130464 | 11/2007 |
| WO | WO2008057323 | 5/2008 |
| WO | WO2008057356 | 5/2008 |
| WO | WO2008060978 | 5/2008 |
| WO | WO2008116151 | 9/2008 |
| WO | WO2010045333 | 4/2010 |
| WO | WO2010096784 | 8/2010 |
| WO | WO2010105088 | 9/2010 |
| WO | WO2010151547 | 12/2010 |

OTHER PUBLICATIONS

"PCT Application No. PCT/US10/27029 International Search Report", May 19, 2010, 10 pages.

* cited by examiner

CONTROLLING PROGRESS IN WAGERING GAMES

RELATED APPLICATIONS

This application claims the priority benefit of U.S. Provisional Application Ser. No. 61/159,591 filed Mar. 12, 2009.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

TECHNICAL FIELD

Embodiments of the inventive subject matter relate generally to wagering game systems and networks that, more particularly, control progress in wagering games.

BACKGROUND

Wagering game machines, such as slot machines, video poker machines and the like, have been a cornerstone of the gaming industry for several years. Traditionally, wagering game machines have been confined to physical buildings, like casinos (e.g., resort casinos, roadside casinos, etc.). The casinos are located in specific geographic locations that are authorized to present wagering games to casino patrons. However, with the proliferation of interest and use of the Internet, shrewd wagering game manufacturers have recognized that a global public network, such as the Internet, can reach to various locations of the world that have been authorized to present wagering games. Any individual with a personal computing device (e.g., a personal computer, a laptop, a personal digital assistant, a cell phone, etc.) can connect to the Internet and play wagering games. Consequently, some wagering game manufacturers have created wagering games that can be processed by personal computing devices and offered via online casino websites ("online casinos"). As a result, wagering game manufacturers, casino operators, and online game providers are constantly in need of innovative concepts that can make the online gaming industry appealing and profitable.

SUMMARY

In some embodiments, a method comprises determining a wagering game player account; determining one or more progression requirements for a persistent-state game associated with the wagering game player account; determining that the one or more progression requirements are fulfilled via activity related to the wagering game player account; storing progression data with the wagering game player account for one or more fulfilled progression requirements; determining a progress chart associated with the persistent-state game, wherein the progress chart presents the wagering game player account's progress for the persistent-state game; and associating one or more progress markers on the progress chart, wherein the one or more progress markers indicate the one or more fulfilled progression requirements.

In some embodiments, the method further comprises presenting the progress chart to the wagering game player account; presenting the one or more progress markers in a linear path of progression on the progress chart; determining one or more game objective requirements associated with attainment of the one or more progress markers; determining that the one or more game objective requirements are fulfilled; and presenting one or more game objective attainment markers along locations of the linear path.

In some embodiments, the method further comprises presenting episodic content at the locations on the progress chart that correlate with the one or more objective attainment markers, wherein the episodic content includes episodes of a storyline that correlates to the linear path of progression on the progress chart.

In some embodiments, the method further comprises limiting progression of the persistent-state game until the wagering game player account performs a subsequent activity; determining that the wagering game player account performs the subsequent activity; and removing the limit.

In some embodiments, the method further comprises unlocking content based on progression in the persistent-state game; presenting an unlocked content indicator on the progress chart; determining a request by the wagering game player account to view the unlocked content; and presenting unlocked content to the wagering game player account.

In some embodiments, the method further comprises determining one or more associations between the wagering game player account and one or more additional wagering game player accounts; and using the one or more associations to present group wagering game play.

Some embodiments include one or more machine-readable storage media having instructions stored thereon, which when executed by a set of one or more processors causes the set of one or more processors to perform operations comprises determining a wagering game player account connected to a wagering game controller; determining a persistent-state game associated with the wagering game player account, wherein the persistent-state game has one or more progress markers within the persistent-state game; determining that while the wagering game player account is connected to the wagering game controller, the wagering game player account attains a progress marker for the persistent-state game; enforcing a progression limit in the persistent-state game based on a requirement for the wagering game player account to subsequently perform an activity; notifying the wagering game player account of the progression limit and the requirement to perform the activity; determining that the wagering game player account performs the activity; and removing the progression limit in the persistent-state game after determining that the wagering game player account performs the activity.

In some embodiments of the storage media, the operation of determining that the wagering game player account performs the activity includes operations further comprising indicating that the activity is performable only via an additional wagering game controller; determining that the wagering game player account connects to the additional wagering game controller; and determining that the wagering game player account performs the activity while connected to the additional wagering game controller.

In some embodiments, the wagering game controller is connected to a casino gaming network and the additional wagering game controller is connected to an online game network.

In some embodiments of the storage media, said operations further comprise determining that the activity includes fulfilling one or more progression requirements for the persistent-state game; determining that the one or more progression requirements are fulfilled via the activity; storing progression data with the wagering game player account for one or more fulfilled progression requirements; and presenting the one or more progress markers on a progress chart for the persistent-state game, wherein the progress chart is accessible to the wagering game player account.

In some embodiments of the storage media, the operation for presenting one or more progress markers on the progress chart includes operations further comprises presenting a linear path of progression for the progress markers on the progress chart to one or more objective attainment markers.

In some embodiments, a system comprises a gaming server that includes a content store configured to store gaming content, and to store persistent-state game content for a persistent-state game, wherein the persistent-state game content includes a progress chart configured to present player progress for the persistent-state game. The gaming server can also include a content controller configured to control gaming content and the persistent-state game content. The gaming server can also include a game progress controller configured to determine a wagering game player account associated with the persistent-state game, determine that the wagering game player account is engaged in gaming activity, determine that the wagering game player account fulfills one or more progression requirements for the persistent-state game during the gaming activity, and store progress data in the wagering game player account for the persistent-state game commensurate with a number of fulfilled progression requirements. The system can also include a client that includes a game progress control module configured to present the gaming content, determine one or more progress markers that represent the number of fulfilled progression requirements, and present the one or more progress markers on the progress chart.

In some embodiments, the gaming server further comprises an awards controller configured to unlock content associated with the number of fulfilled progression requirements.

In some embodiments, the persistent-state game content includes a plurality of episodes for a story line, and wherein the game progress control module is further configured to present one or more of the plurality of episodes on the progress chart.

In some embodiments, the system further comprises a web server that includes a game controller configured to determine that the wagering game player account fulfills one or more additional progression requirements for the persistent-state game during online activity, and store additional progress data in the wagering game player account for the persistent-state game commensurate with a number of additional fulfilled progression requirements.

In some embodiments, an apparatus comprises a game progress control module configured to determine a persistent-state game associated with a wagering game player account, unlock wagering game content based on progression in the persistent-state game, present an unlocked content indicator on a progress chart associated with the persistent-state game, determine a request by the wagering game player account to access the unlocked wagering game content, and present the unlocked content to the wagering game player account.

In some embodiments, the unlocked wagering game content is an unlocked wagering game feature for a wagering game, wherein the unlocked wagering game feature is unavailable during wagering game play until it is unlocked via the persistent-state game, and wherein the game progress control module is further configured to determine that the wagering game player account plays the wagering game, and present the unlocked wagering game feature.

In some embodiments, the game progress control module is further configured to store progression data in the wagering game player account associated with progress in the persistent-state game, present access to the wagering game player account for the wagering game via a player account interface, determine that the wagering game player account access the wagering game via the player account interface, and present the wagering game with the game feature.

In some embodiments an apparatus comprises means for determining a wagering game player account; means for determining one or more progression requirements for a persistent-state game; means for determining that the one or more progression requirements are fulfilled via activity related to the wagering game player account; means for presenting one or more progress markers on a progress chart available to the wagering game player account; means for storing progression data with the wagering game player account for the one or more progress markers; means for unlocking content based on progression in the persistent-state game; means for presenting an unlocked content indicator on the progress chart; means for determining a request by the wagering game player account to view the unlocked content; and means for presenting unlocked content to the wagering game player account.

In some embodiments, the apparatus further comprises means for providing a choice of unlocked content.

In some embodiments, the wagering game player account is logged on to a first gaming venue, and wherein the means for determining a request by the wagering game player account to view the unlocked content further comprises, means for restricting access to the unlocked content via the first gaming venue, and means for determining that the wagering game player account accesses the unlocked content from a second gaming venue.

In some embodiments, the apparatus further comprises means for presenting the unlocked content indicator in association with the one or more progress markers.

In some embodiments, the apparatus further comprises means for providing coded access to the unlocked content.

In some embodiments, the apparatus further comprises means for providing levels of access to the unlocked content.

In some embodiments, the apparatus further comprises means for determining one or more game objective requirements associated with the one or more progress markers; means for determining that the one or more game objective requirements are fulfilled; and means for presenting one or more objective attainment markers on the progress chart that mark the completion of the one or more game objective requirements.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
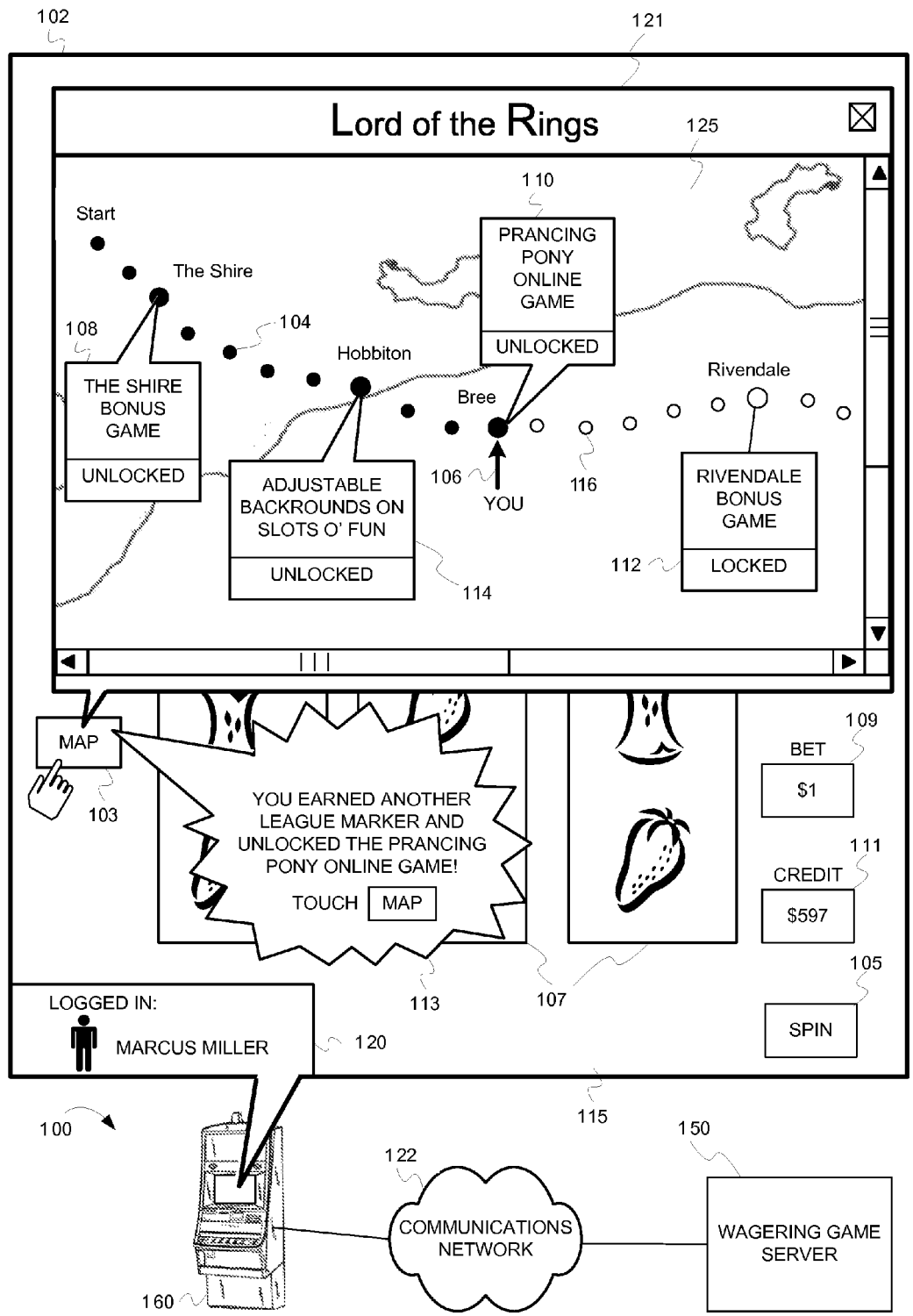
FIG. 1 is an illustration of presenting an episodic persistent-state game, according to some embodiments.

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

Wagering games are expanding in popularity. Many wagering game enthusiasts are demanding greater access to wagering games and content related to wagering games. Further, wagering game providers are constantly in need of concepts that can make the gaming industry appealing and profitable.

In some embodiments, a wagering game system can control progress in wagering games and present the progress in a persistent-state game. The wagering game system can control player account settings and track persisted progress. In some instances, the wagering game system can control progress limits and player activity requirements via multiple venues (e.g., online, in a casino, etc.). The wagering game system can control wagering game progress and present the progress with various graphics (e.g., charts, maps, images, etc.). The system can present such progress in a network wagering venue, such as an online casino, a wagering game website, a wagering network, etc. Wagering games, progress charts, player data, etc. can be presented over any type of communications network (e.g., public or private) that provides access to wagering games, such as a website (e.g., via wide-area-networks, or WANs), a private gaming network (e.g., large-area-networks, or LANs), a file sharing networks, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.). In some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling".

FIG. 1 is a conceptual diagram that illustrates an example of presenting an episodic persistent-state game, according to some embodiments. In FIG. 1, a wagering game system ("system") 100 includes a wagering game machine 160 connected to a wagering game server 150 via a communications network 122. The wagering game machine 160 presents a display 102. The wagering game machine 160 presents a wagering game 115 on the display 102. The wagering game 115 can include wagering game elements, such as slot reels 107. The wagering game 115 can also include a bet control 109, a credit meter 111, a spin control 105, and any other panels, displays, controls, configurations, menus, account information, etc., used in playing the wagering game and transacting wagers. For instance, the wagering game 115 presents player account information 120 of a player account logged in to a wagering game session. The wagering game 115 can also include a map button 103. During the wagering game session, the system 100 can determine an event. The event can occur during the wagering game session (e.g., the wagering game 115 results in a win, the player account performs a specific activity, etc.). The event can also occur before the wagering game session, and the system 100 recognizes the previous event (e.g., player filled out a survey while visiting a partner's website, the player played a game at an online game website, a player's friend performed a task, etc.). The event can also be a combination of previous and current events (e.g., the player previously obtained an item while playing an online game and a corresponding event occurs during the wagering game session related to the previously obtained item). The system 100 can determine the event and can trigger a progress prompt 113 (e.g., a prompt of game progress, a prompt of an award, a prompt for player activity related to progress achievements, etc.) for a persistent-state game 121. The persistent-state game 121 is a game whose state (e.g., status, settings, etc.) can be stored, or persisted, in memory (e.g., on the wagering game machine 160, on a player account, on a player's memory device, etc.) for an extended period beyond a single play of a wagering game. For instance, the persistent-state game 121 can persist while the player is offline (e.g., when the player account is logged off a wagering game network). The persistent-state game 121 can include a progress chart that indicates game progress for the persistent-state game 121. The progress chart can take one of many forms, such as a map 125. The progress chart can be related to a theme for the persistent-state game (e.g., the map 125 is a representation of Frodo Baggins' journey through Middle Earth in the "Lord of the Rings" tale). The system 100 can present the map 125 after the progress prompt 113 (e.g., after a player selects the map button 103, automatically when an event occurs, etc.). The persistent-state game 121 can track progress in units (e.g., miles, leagues, steps, etc.), and can indicate the progress units using markers on the progress chart. For example, the map 125 indicates progression unit markers (e.g., attained league markers 104, unattained league markers 116). The system 100 can also determine when a player account completes game objectives, such as after attaining a certain number of progress units, and indicate the game objectives with game objective markers. For example, the map 125 indicates game objective call-outs 108, 114, 110, and 112 for various objectives (e.g., locations, waypoints, etc.) attained on a linear path through the course of the persistent-state game 121. The system 100 can also provide awards (e.g., unlocked content) associated with each of the game objectives. The system 100 can present indications of the awards in conjunction with the game objective call-outs 108, 114, 110, and 112. The system 100 can also present a current-status marker 106 that indicates the player account's most recently attained progression unit.

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
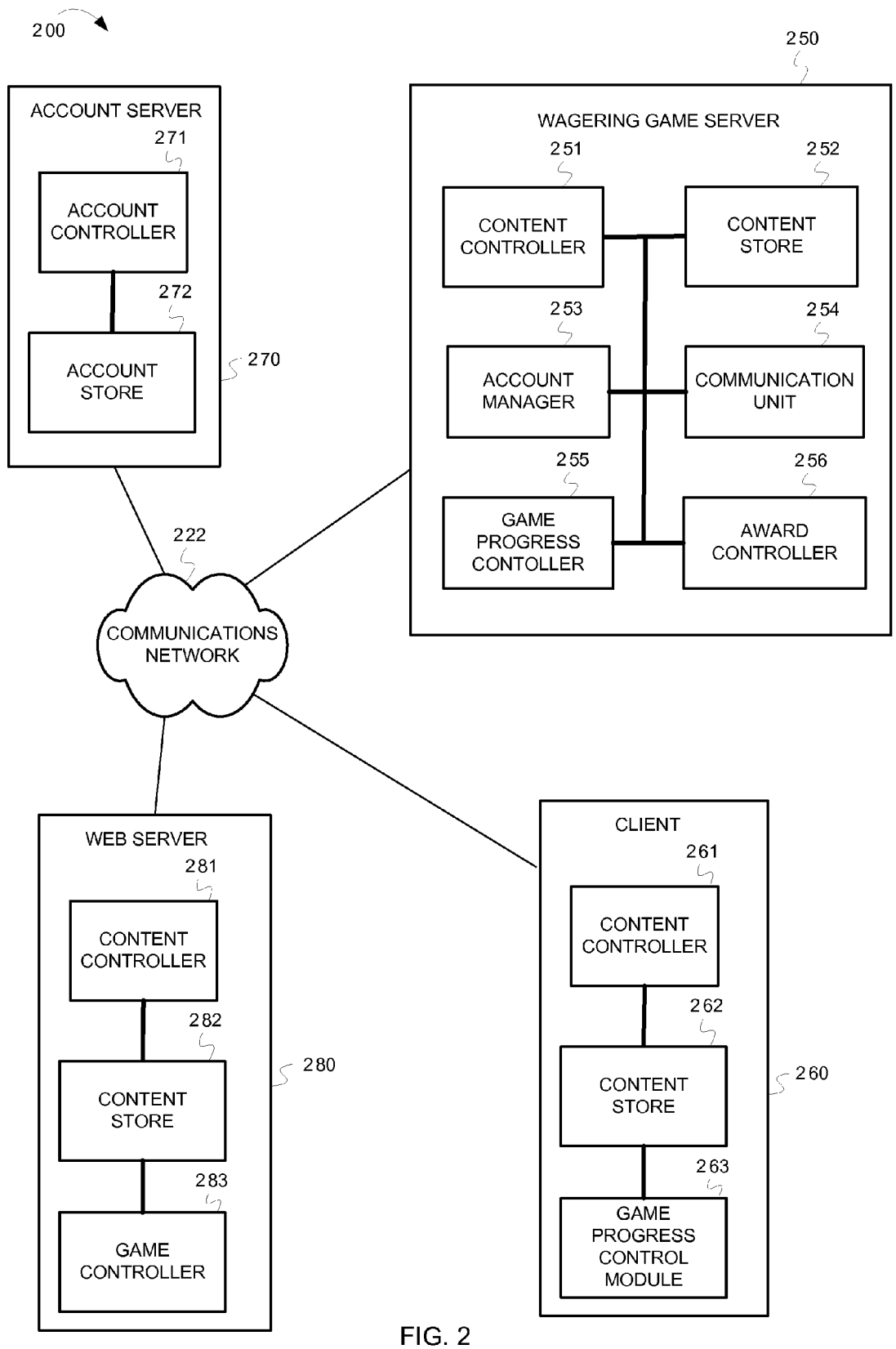
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networks. The account server 270 can store and track player information, such as identifying information (e.g., avatars, screen name, account identification numbers, etc.) or other information like financial account information, social contact information, etc. The account server 270 can contain accounts for social contacts referenced by the player account. The account server 270 can also provide auditing capabilities, according to regulatory rules, and track the performance of players, machines, and servers. The account server 270 can include an account controller 271 configured to control information for a player's account. The account server 270 can also include an account store 272 configured to store settings, preferences, player profile data, and other information for a player's account including persistent-state game progress achievements, awards, progress requirement completion, etc.

The wagering game system architecture 200 can also include a wagering game server 250 configured to control wagering game content, provide random numbers, and communicate wagering game information, account information, and other information to and from a client 260. The wagering game server 250 can include a content controller 251 configured to manage and control content for the presentation of content on the client 260. For example, the content controller 251 can generate game results (e.g., win/loss values), including win amounts, for games played on the client 260. The content controller 251 can communicate the game results to the client 260. The content controller 251 can also generate random numbers and provide them to the client 260 so that the client 260 can generate game results. The wagering game server 250 can also include a content store 252 configured to contain content to present on the client 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the client 260 and to communicate with other systems, devices and networks. The wagering game server 250 can also include a game progress controller 255 configured to control progress of wagering games, control progress graphics (e.g., maps, charts, etc.) for persistent-state games, determine activities associated with progress limits, control activities for player progress requirements in different venues, etc. The wagering game server 250 can also include an award controller 256 configured to provide and redeem awards, unlock content, etc.

The wagering game system architecture 200 can also include the client 260 configured to present wagering games and receive and transmit information to control progress in wagering games. The client 260 can be a computer system, a personal digital assistant (PDA), a cell phone, a laptop, a wagering game machine, or any other device or machine that is capable of processing information, instructions, or other data provided via the communications network 222. The client 260 can include a content controller 261 configured to manage and control content and presentation of content on the client 260. The client 260 can also include a content store 262 configured to contain content to present on the client 260. The client 260 can also include a game progress control module 263 configured to control progress of wagering games, present graphics indicating progress of persistent-state games (e.g., charts, maps, etc.), determine player activities associated with progression limits, etc.

The wagering game system architecture 200 can also include the web server 280 configured to control and present an online website that hosts wagering games and other wagering activity. The web server 280 can include a content controller 281 configured to control online game content. The web server 280 can also include a content store 282 configured to store online game content, progress charts, etc. The web server 280 can also include a game controller 283 configured to control online progress of persistent-state games in player accounts, present online progress charts for persistent state games, etc.

Each component shown in the wagering game system architecture 200 is shown as a separate and distinct element connected via a communications network 222. However, some functions performed by one component could be performed by other components. For example, the wagering game server 250 can also be configured to perform functions of the web server 280 and the account server 270, and other network elements and/or system devices. Furthermore, the components shown may all be contained in one device, but some, or all, may be included in, or performed by multiple devices, as in the configurations shown in FIG. 2 or other configurations not shown. For example, the account manager 253 and the communication unit 254 can be included in the client 260 instead of, or in addition to, being a part of the wagering game server 250. Further, in some embodiments, the client 260 can determine wagering game outcomes, generate random numbers, etc. instead of, or in addition to, the wagering game server 250. Wagering game machines described herein (e.g., the client 260) can take any suitable form such as floor standing models, handheld mobile units, bar-top models, workstation-type console models, surface computing machines, etc. Further, the wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as a thin, thick, or intermediate client. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
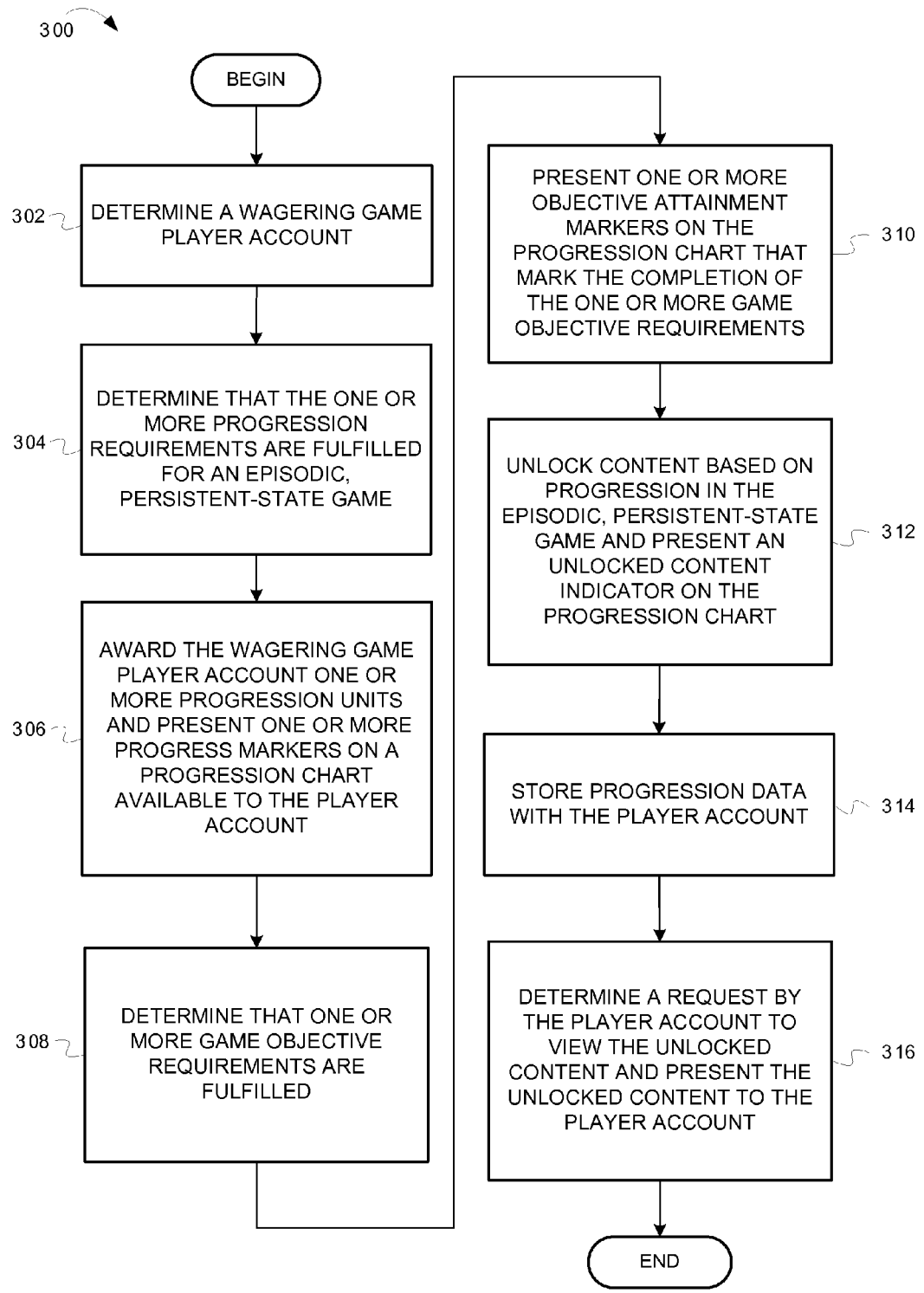
FIG. 3 is a flow diagram 300 illustrating presenting and controlling progress in a persistent-state wagering game, according to some embodiments.
Figure 4:
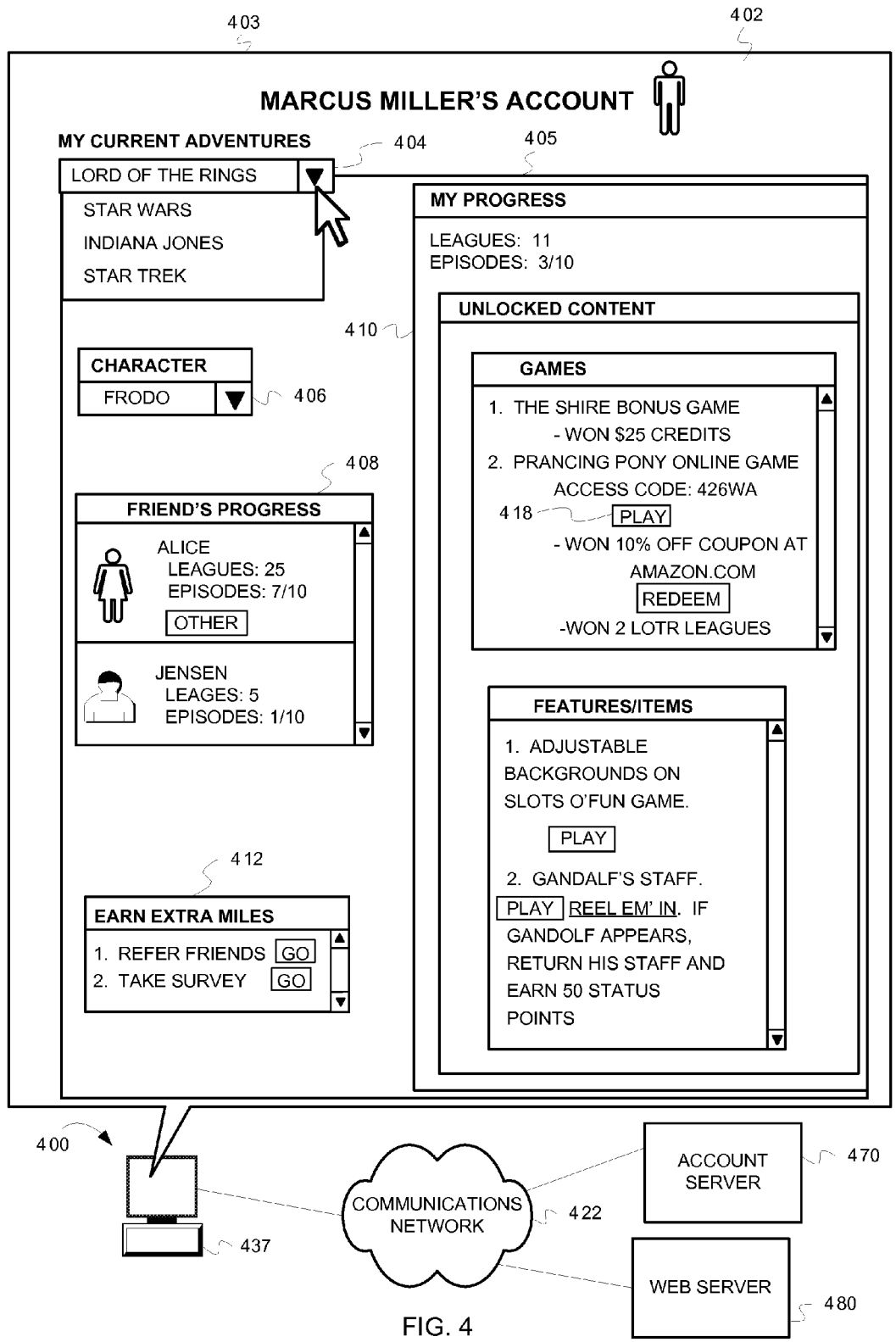
FIG. 4 is an illustration of controlling player account settings and tracking persisted progress, according to some embodiments.

FIG. 3 is a flow diagram ("flow") 300 illustrating presenting and controlling progress in a persistent-state wagering game, according to some embodiments. FIGS. 1 and 4 are conceptual diagrams that help illustrate the flow of FIG. 3, according to some embodiments. This description will present FIG. 3 in concert with FIGS. 1 and 4. In FIG. 3, the flow 300 begins at processing block 302, where a wagering game system ("system") determines a wagering game player account. The player account can be logged in to a wagering game machine and engaged in a wagering game session, as described previously in FIG. 1.

The flow 300 continues at processing block 304, where the system determines that the one or more progression requirements for an episodic, persistent-state game are fulfilled. The progression requirements can be related to activity performed by the player account, activity performed by other player accounts associated with the player account, or activity or events that occur in association with the player account though not performed by a player account. Some examples of activity or events performed by the player account can include: performance, or perceived performance, by the player account during wagering game play (e.g., slot reel spins, bets, etc.), performance by the player account during non-wagering game play (e.g., performance at casual games and skill-based games), providing personal information (e.g., participating in surveys, forums, message boards, etc.), participating in marketing offers (e.g., visiting marketing partners websites, buying merchandise at third-party websites, etc.), recruitment (e.g., inviting social contacts associated with the account to be contacted for marketing purposes, recruiting friends to register for games, and so forth. Some examples of activity performed by other player accounts associated with the player account can include: performance of social-contact player accounts in wagering games and non-wagering games, recruited friend's accomplishments in persistent-state games, activity performed by a social contact player account as a wagering agent of the player account, activity performed by a social contact player account that is attributed, at least in part (e.g., multi-level relationship) to the player account, etc. Some examples of activity or events that occur in association with the player account though not performed by a player account can include an extraordinary event or outcome of a wagering game that occurs randomly (e.g., a mystery bonus, a progressive jackpot, etc.).

The flow 300 continues at processing block 306, where the system awards the wagering game player account one or more progression units and presents one or more progress markers on a progress chart available to the player account. In some embodiments, the system can determine that the progression requirement(s) were fulfilled, and consequently award progression units. The system can award progression units according to the game rules (e.g., fulfillment of one progression requirement equals an award of one progression unit). In some embodiments, the system can award multiple progression units for the fulfillment of one progression requirement (e.g., fulfillment of one very significant progression requirement equals an award of multiple progression units). The progression units can be stored and represented by one or more progress markers (e.g., graphical images) on the persistent-state game's progress chart. In some embodiments, the progress chart can follow a theme for the persistent-state game (e.g., the progress chart can be a map, book, building, etc. based on the theme). The progress chart can include a path, or pattern or progress, from one point to another. The system can mark the path, or pattern of progress, using the progress markers. The progress markers represent consecutive locations, points, positions, sites, spots, etc. along the path of progression (e.g., leagues on a map, miles on a meter, pages in a book, notches on a stick, stories in a building, landmarks on a landscape, objectives on a list, etc.) In some embodiments, the system can present a linear progression of progress markers on the progress chart. In some embodiments, the progression can be non-linear. In other embodiments, the progression can be a combination of linear and non-linear. In some embodiments, the system can limit the progression units to a certain number of progression units per wagering game session and can enforce requirements that the player account perform other activities to disable the progression limit (e.g., view ads, go online, stop player for 20 minutes, play a different game, try new games, participate in a chat, recruit friends, etc.). In some embodiments, player accounts can earn progression units at different rates based on various factors, such as a casino's advertised reward rate, a player account's status level, a denomination on a wagering game, etc. For instance, the system can provide configuration controls that casinos can use to modify the degree of progression units offered (e.g., rate of progression units awarded), so that different casinos can offer differing (e.g., greater or lesser) amounts of progression units for similar persistent-state games. Further, the system can provide rewards with a persistent-state game, where the rewards that are not affected by a wagering game's math, or pay tables, payout, etc. The system can present controls that a casino can use to indicate the source of the funds for the rewards, such as a marketing account.

The flow 300 continues at processing block 308, where the system determines that one or more game objective requirements are fulfilled. In some embodiments, progression requirements are related to the attainment of a specified, or predetermined, number (e.g., a plurality) of progression units in the persistent-state game. After a player account attains the predetermined number of progression units, the system can determine that the player account has achieved, or fulfilled, a "game objective" requirement. Progress markers can mark a progression along the path toward game objectives (e.g., goals, posts, landmarks, milestones, etc.).

The flow 300 continues at processing block 310, where the system presents one or more objective attainment markers on the progress chart that mark the completion of the one or more game objective requirements. The system can indicate the attainment of a game objectives (e.g., a major accomplishment, milestone, etc.) using the one or more objective attainment markers. The objective attainment markers can be specialized progress markers that indicate a point on the progress chart's path of progress where a game objective was achieved. In some embodiments, the system can present episodic content for different locations on the progress chart that correlate with the one or more objective attainment markers. For example, the episodic content can relate to an episode in a story that the progress chart presents. The episodic content can include visuals, sounds, fonts, backgrounds, etc. that can present a portion of a story line for the persistent-state game. The episodic content can be different at each objective attainment marker, and can be related to a sub-theme for the objective attainment marker. For example, as in FIG. 1, the player account may have progressed from Hobbiton to Bree, where a specific story-line event occurred in the story of Frodo's journey. The system can cause the scenery in the persistent-state game 121 to change based on the story-line event (e.g., horsemen attacking Frodo in the Prancing Pony tavern). The system 100 can present the objective attainment markers (e.g., the game objective call-out 110). The system 100 can present various forms of content that depict the story-line event (e.g., movie files, animations, sounds, etc.) in association with the objective attainment marker. The system 100 can also present facts, trivia, or other interesting content that relates to the story-line event. The system 100 can also present content that is not related to the story line, such as advertising. The progression unit markers (e.g., the attained league markers 104, the unattained league markers 116) lead the way through the story from episode to episode (i.e., from objective attainment marker to objective attainment marker). In some embodiments, the objective attainment marker may be referred to as an "episode" marker, because it can relate to the episodes of a story.

The flow 300 continues at processing block 312, where the system unlocks content based on progression in the persistent-state game and presents an unlocked content indicator on the progress chart. The system can associate an award, such as unlocking new content, with the fulfillment of the one more game objective requirements or one or more progression requirements. The system can present unlocked content indicators in association with the one or more objective attainment markers and/or progression units. One example of unlocked content is an online game. The system can drive players to a website, from a casino, by offering unlocked content that can be accessed from the website, such as an unlocked online game. For instance, the system can unlock an online game that the player has to play online and provide the player account with access rights to play the online game. In some embodiments, the system can print out a ticket from casino that has a code that the player can enter at a website to play the online game. In some embodiments, the system can deliver the code electronically, such as via email. In other embodiments, the system can store the code with the player account and provide access when the player logs on to the game website. When a player account logs on to the website, the system determines that the player account has connected, receives the authorization code from the player (e.g., via player account metadata), and present the online game. During the online game, the system can provide progression units, and unlock in-casino content, that the player can play when the player returns to a casino network. Thus, the system can drive the player back and forth between casinos, websites, or other networks and/or wagering venues. In some embodiments, the unlocked content can be items or attributes of wagering games that are normally not available unless unlocked. The game items and attributes can include customized games assets (e.g., graphics, sounds, etc.), special character symbols (e.g., Gandalf's white robe staff), special character abilities (e.g., Frodo's character takes on an intense glow), new wagering game features (e.g., game bonus multipliers), new wagering games, new animations on backgrounds, reels, etc., bonus games, introductory content for a related game (e.g., demo), player account benefits (e.g., player forum access, social status points, trophies, etc.), etc. In some embodiments, the system can provide a choice of unlocked content. For instance, the system can present multiple options for unlocked content and permit the player account to select one of the options. As mentioned above, in some embodiments, the system can unlock content at game objective attainment markers. In other embodiments, however, the system can randomly unlock content. In some embodiments, the system can provide an award in association with the unlocked content. In some embodiments, the system can cap the unlocked content. In some embodiments, the system can make unlocked content accessible only from another gaming venue (e.g. as in the case of the unlocked online game).

The flow 300 continues at processing block 314, where the system stores progression data with the player account. For instance, the system can store the one or more awarded progression units, the one or more attained game objectives, and the unlocked content in the player account so that the player can access the progression data at any time when logged on to the wagering game network. FIG. 4 illustrates an example of a player account 402 that presents stored data for persistent-state games. In FIG. 4, a wagering game system ("system") 400 includes a computer system 437 connected to an account server 470 via a communications network 422. In some embodiments, the system 400 can also include a web server 480. The computer system 437 present a player account interface 403. The player account interface 403 can include a persistent-state game selection control 404, from which a player can select one of the persistent-state games for which the player account 402 is registered. When a persistent-state game is selected from the persistent-state game selection control 404, the system 400 can present information about the selected persistent-state game within a game data console 405. The game data console 405 can include a character selection control 406, to select a character's progression path within an episodic game. For example, if the player account 402 selected the character "Frodo," the system 400 can cause progress on a progress chart to follow one character's path through a storyline for that character. The game data console 405 can also include a progress console 410 that describes various information related to progress markers, game objective attainment, unlocked content, or other features (e.g., unlocked games, game codes, awards, unlocked game features, game items, etc.). The game data console 405 can also include a friend's progress console 408. The friend's progress console 408 can list social contacts that are associated with the player account 402. The friend's progress console 408 shows the social contact's progress in the same game selected by the persistent-state game selection control 404, if the social contact is also registered for the same persistent-state game. The system 400 can track player accounts for the social contacts on the account server 470. Further, the game data console 405 can also include a progression console 412 that offers the player account 402 additional ways, outside of wagering game play, to earn progression units for the selected persistent-state game.

The flow 300 continues at processing block 316, where the system determines a request by the player account to view the unlocked content and presents unlocked content to the player account. In some embodiments, the system determines that player selects the unlocked content indicator. For instance, in FIG. 1, the system 100 can determine if the player selects the game objective call-outs 108 to play the "Shire Bonus Game." In other embodiments, in FIG. 4, the system 400 can determine that the player selects a "play" button 418 from the game data console 405 (e.g., for the prancing pony game.) The system 400 can communicate with the web server 480 and launch a web-browser on the computer system 437 that logs the player on to a website and presents the Prancing Pony online game (e.g., see FIG. 6 for an example). Returning to FIG. 3, in some embodiments, the system can provide levels of access to the unlocked content. For instance, the system can enforce a requirement that a specific event occurs in order to access the next level of unlocked content (e.g., present level 1 of the Prancing Pony online game, but can determine whether the player has first visited an affiliate's website before presenting level 2 of the Prancing Pony online game). In some embodiments, the system can provide greater access to unlocked content based on a player's status, game play, history, etc.

Figure 5:
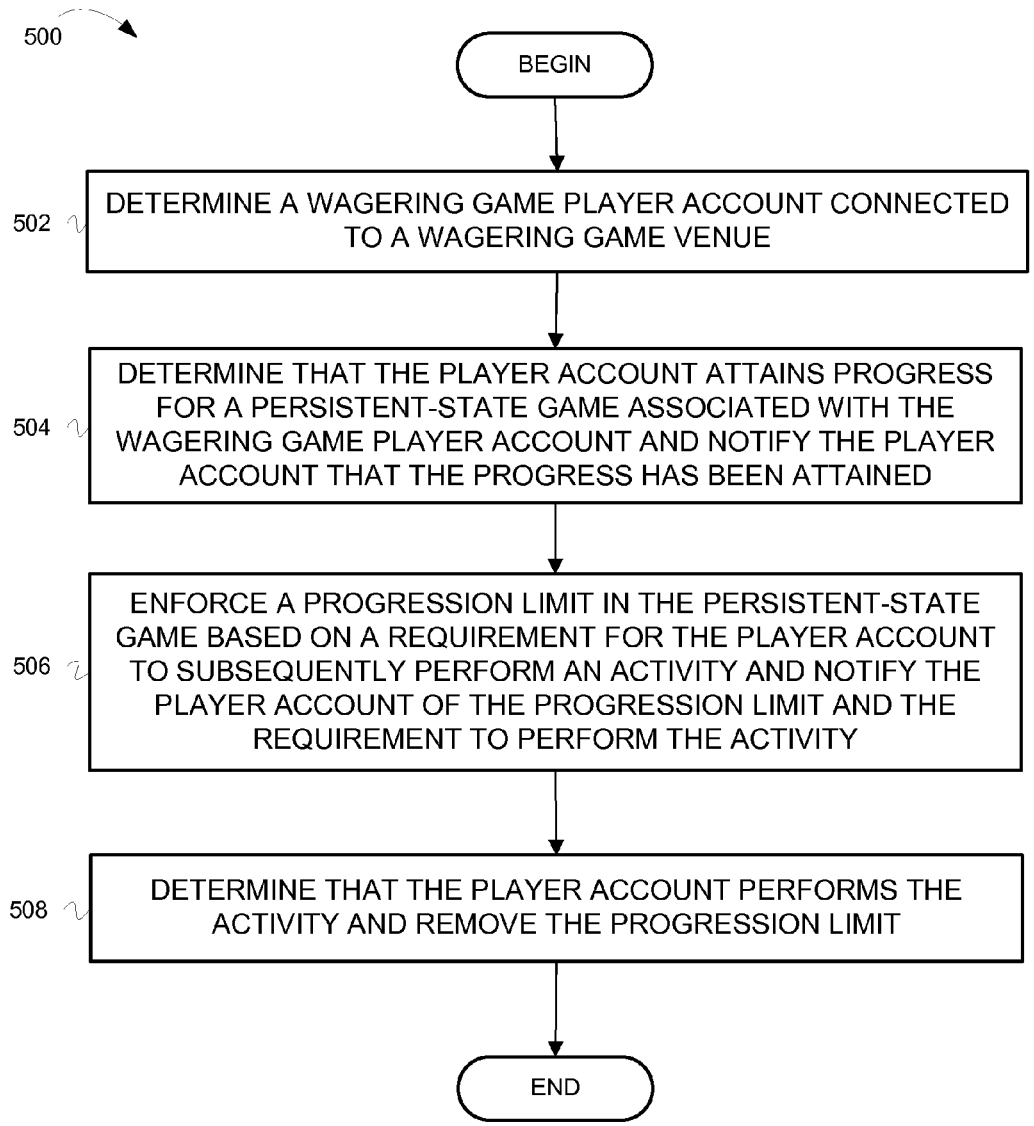
FIG. 5 is a flow diagram 500 illustrating controlling progress limits and player activity requirements, according to some embodiments.
Figure 6:
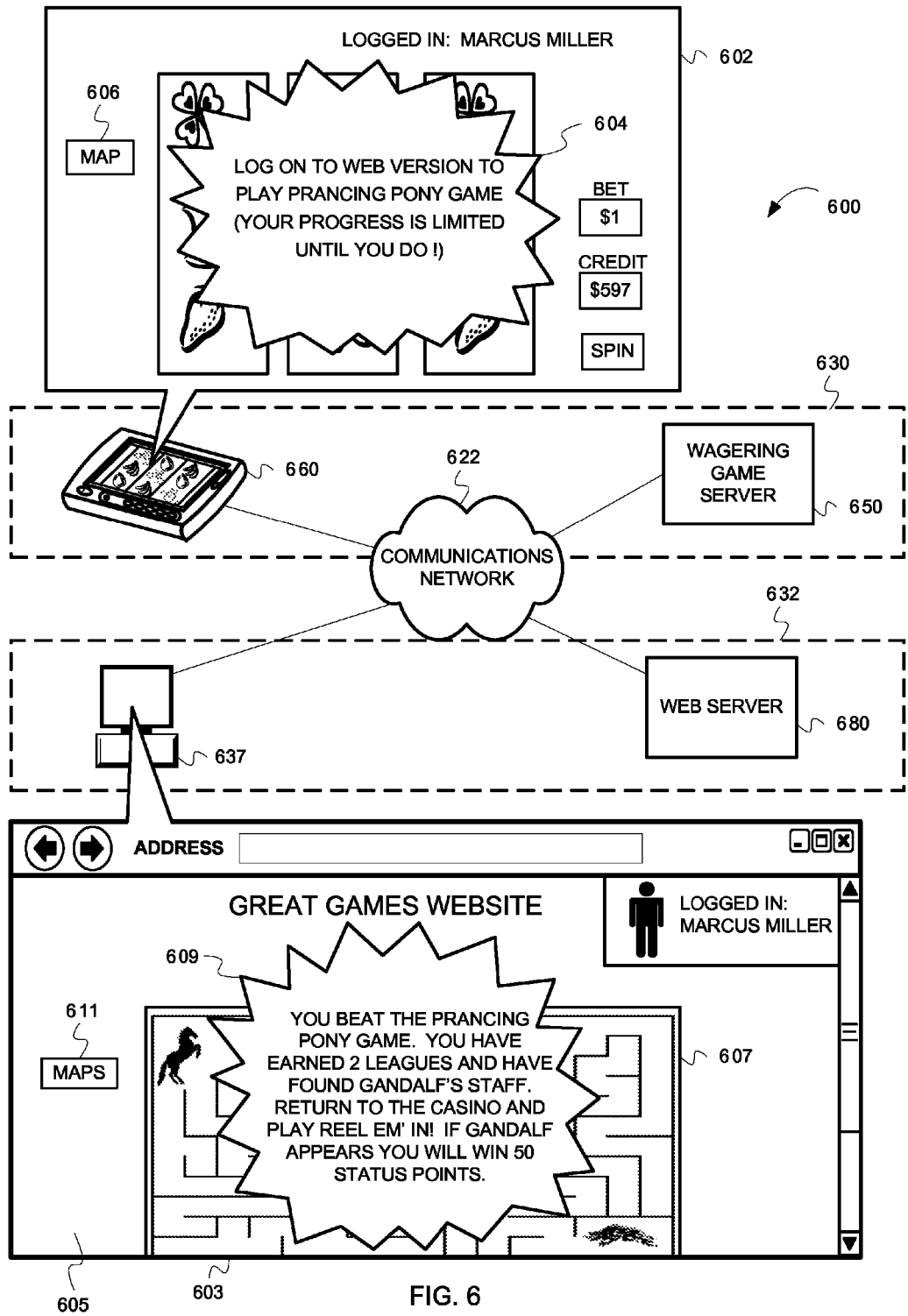
FIG. 6 is an illustration of controlling wagering game progress, player interactivity, and game awards via multiple venues, according to some embodiments.

FIG. 5 is a flow diagram ("flow") 500 illustrating controlling progress limits and player activity requirements, according to some embodiments. FIG. 6 is a conceptual diagram that helps illustrate the flow of FIG. 5, according to some embodiments. This description will present FIG. 5 in concert with FIG. 6. In FIG. 5, the flow 500 begins at processing block 502, where a wagering game system ("system") determines a wagering game player account connected to a wagering game venue.

The flow 500 continues at processing block 504, where the system determines that the player account attains progress for a persistent-state game associated with the wagering game player account and notifies the player account that the progress has been attained. The progress can be associated with progress markers, or indicators, such as progress markers, objective attainment markers, or other indicators of progress in the persistent-state game. The system can determine that the player account attains the progress while the player account is connected to the wagering game venue. The system can notify the player account of the progress via prompts, emails, messages, etc. In FIG. 1, for example, the system 100 notifies the player account via the progress prompt 113. FIG. 6 also illustrates an example. In FIG. 6, a wagering game system ("system") 600 includes a mobile wagering game machine ("mobile machine") 660 connected to a communications network 622. Also connected to the communications network 622 are a wagering game server 650, a computer system 637, and a web server 680. The mobile machine 660 is connected to a first game venue, such as a wagering game network 630. The wagering game network 630 can wirelessly provide wagering games to the mobile machine 660, or via wired connections to other wagering game devices (e.g., standing-model wagering game machines, bar-top model wagering game machines, wagering game docking stations, etc.). The mobile machine 660 can present a game display 602 that is similar to the display 102 presented in FIG. 1. The game display 602 can include features that present and control a persistent-state game, such as a map button 606 that can present a progress chart for the persistent-state game. The system 600 can determine that a player account attains progress for the persistent-state game and notify the player account via a progress prompt 604. The progress prompt 604 can notify the player that the progress includes unlocked content, such as a web version of a game (e.g., the Prancing Pony online game). In some embodiments, the system 600 can provide an award (e.g., a prize that can be redeemed) for attaining the progress. In some embodiments, the system 600 can also notify the player via a progression chart (e.g., after the player account activates the map button 606).

The flow 500 continues at processing block 506, where the system enforces a progression limit in the persistent-state game based on a requirement for the player account to subsequently perform an activity and notify the player account of the progression limit and the requirement to perform the activity. In some embodiments, the progression limit caps, or limits, some form of progress in the persistent-state game, such as no further attainment of progression units, not attainment of game objectives, etc. For example, in FIG. 6, the progress prompt 604 indicates to the player account that the player account's progress in the persistent state game is limited until the player visits a different gaming venue, such as an online gaming network 632. The different gaming venue can also be a different wagering game network, a social network, a website, a private network, an intranet, a different wagering game machine, a different bank of machines, a different sub-network of the wagering game network 630, etc.

The flow 500 continues at processing block 508, where the system determines that the player account performs the activity and removes the progression limit. The system can remove the progression limit after determining that the player account performed the activity. In some embodiments, the requirement can be that the player account must perform the subsequent activity while connected to a foreign, or different, gaming venue (e.g., a different network than the one that the player is currently logged in to). For example, in FIG. 6, the system 600 can determine that the player account logs on to the online gaming network 632, via a website 605. The computer system 637 can present a web browser 603. The web browser 603 can access web content from the web server 680, and can present a version of a Prancing Pony online game 607. The system 600 can determine that the player account plays the Prancing Pony online game while connected to the online gaming network 632. The website 605 can also include features and controls associated with the persistent-state game, such as via an additional map button 611. In some embodiments, the system can determine that the player account achieves, or attains, further progress in the persistent-state game by performing the required activity, such as by attaining a win, a skill level, or other achievement on the Prancing Pony online game 607. The system 600 can provide an additional progress prompt 609 that indicates that the required activity was performed and that the additional progress was achieved. The system 600 can also indicate the progress via a progress chart displayed after the player account activates the additional map button 611.

The additional progress can include unlocking of additional content that, in some embodiments, can only be accessed via the first gaming venue (e.g., the wagering game network 630). The system 600 can determine that the player account logs back in to the wagering game network 630 and presents the unlocked content.

Additional Example Embodiments

According to some embodiments, a wagering game system ("system") can provide various example devices, operations, etc., to control progress in wagering games. The following non-exhaustive list enumerates some possible embodiments.

In some embodiments, the system can provide a competitive or group aspect, such as an online leader board. The online leader board can present progress of multiple players for one or more persistent-state games. The leader board can also provide offers for additional content, additional progress, additional activities, etc. For example, the system can unlock bonus games if a player account stays on the leader board for a long time. In some embodiments, the system can link player accounts together. For example, the system can provide controls for a player account to link itself to other player accounts. The system can determine linked accounts and join player accounts together in group games, group leader boards, etc. The system can combine information for the associated player accounts and use the combined information (e.g., to present on group leader boards, to market as a group, etc.).

In some embodiments, the system can present online games that are skill-based and can provide rewards that are not money based.

In some embodiments, the system can encourage marketing and demographic incentives for joining a loyalty based program.

In some embodiments, the system can provide a forum to trade unlocked content. For example, a player account can offer to sell or trade bonus games, online games, etc., to other player accounts that are registered for a persistent-state game.

Additional Example Operating Environments

This section describes example operating environments, systems and networks, and presents structural aspects of some embodiments.

Computer System

Figure 7:
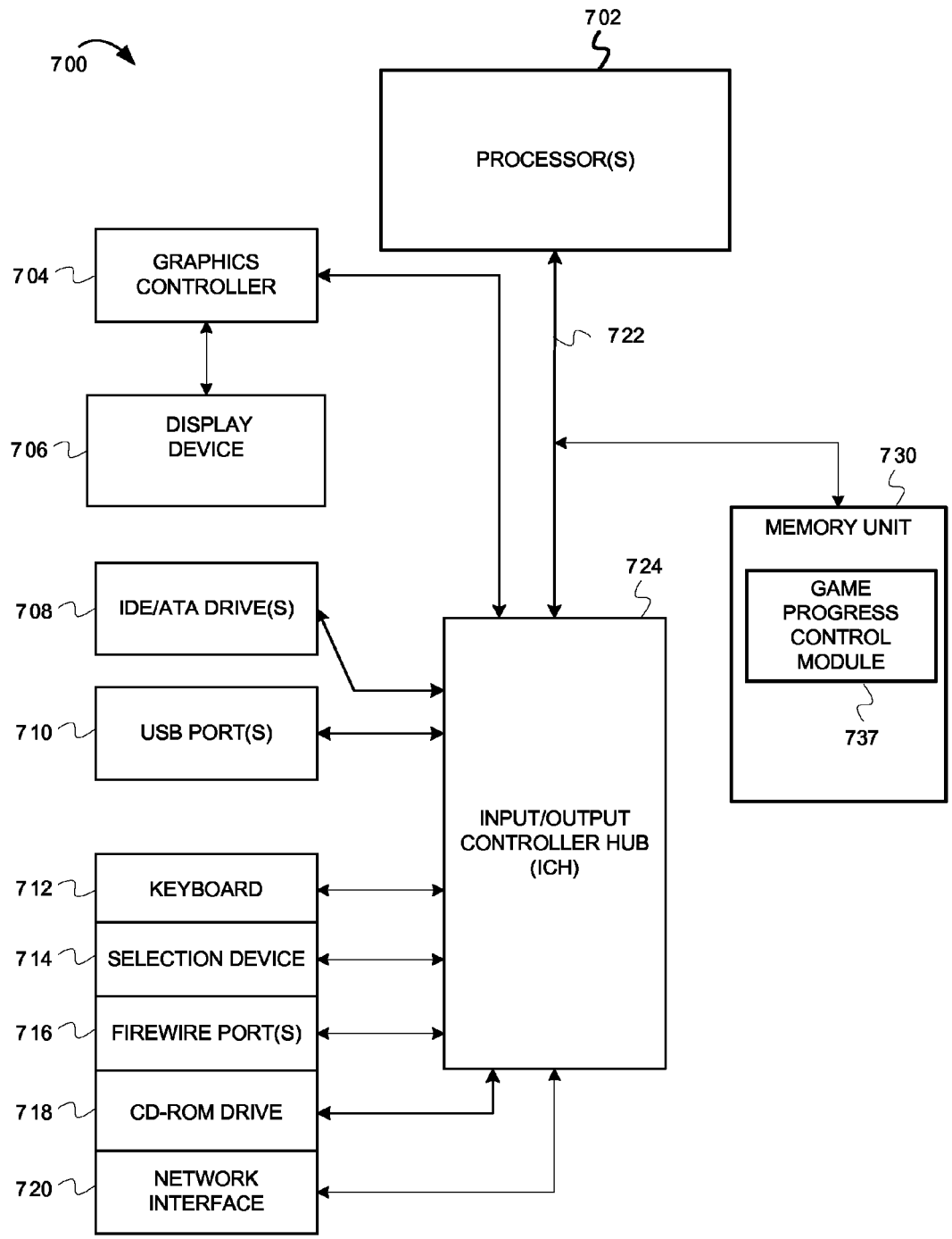
FIG. 7 is an illustration of a computer system 700, according to some embodiments.

FIG. 7 is a conceptual diagram that illustrates an example of a computer system 700, according to some embodiments. As shown in FIG. 7, the computer system 700 may include a processor unit 702, a memory unit 730, a processor bus 722, and an input/output controller hub (ICH) 724. The processor unit 702, the memory unit 730, and the ICH 724 may be coupled to the processor bus 722. The processor unit 702 may comprise any suitable processor architecture. The computer system 700 may comprise one, two, three, or more processors, any of which may execute a set of instructions in accordance with some embodiments.

The memory unit 730 may also include an I/O scheduling policy unit 7 and I/O schedulers 7. The memory unit 730 can store data and/or instructions, and may comprise any suitable memory, such as a dynamic random access memory (DRAM), for example. The computer system 700 may also include one or more suitable integrated drive electronics (IDE) drive(s) 708 and/or other suitable storage devices. A graphics controller 704 controls the display of information on a display device 706, according to some embodiments.

The input/output controller hub (ICH) 724 provides an interface to I/O devices or peripheral components for the computer system 700. The ICH 724 may comprise any suitable interface controller to provide for any suitable communication link to the processor unit 702, the memory unit 730, and/or to any suitable device or component in communication with the ICH 724. The ICH 724 can provide suitable arbitration and buffering for each interface.

For one embodiment, the ICH 724 provides an interface to the one or more IDE drives 708, such as a hard disk drive (HDD) or compact disc read only memory (CD ROM) drive, or to suitable universal serial bus (USB) devices through one or more USB ports 710. For one embodiment, the ICH 724 also provides an interface to a keyboard 712, selection device 714 (e.g., a mouse, trackball, touchpad, etc.), CD-ROM drive 718, and one or more suitable devices through one or more firewire ports 716. For one embodiment, the ICH 724 also provides a network interface 720 though which the computer system 700 can communicate with other computers and/or devices.

The computer system 700 may also include a machine-readable medium that stores a set of instructions (e.g., software) embodying any one, or all, of the methodologies for control progress in wagering games. Furthermore, software can reside, completely or at least partially, within the memory unit 730 and/or within the processor unit 702. The computer system 700 can also include a game progress control module 737. The game progress control module 737 can process communications, commands, or other information, to control progress in wagering games. Any component of the computer system 700 can be implemented as hardware, firmware, and/or machine-readable media including instructions for performing the operations described herein.

Wagering Game Machine Architecture

Figure 8:
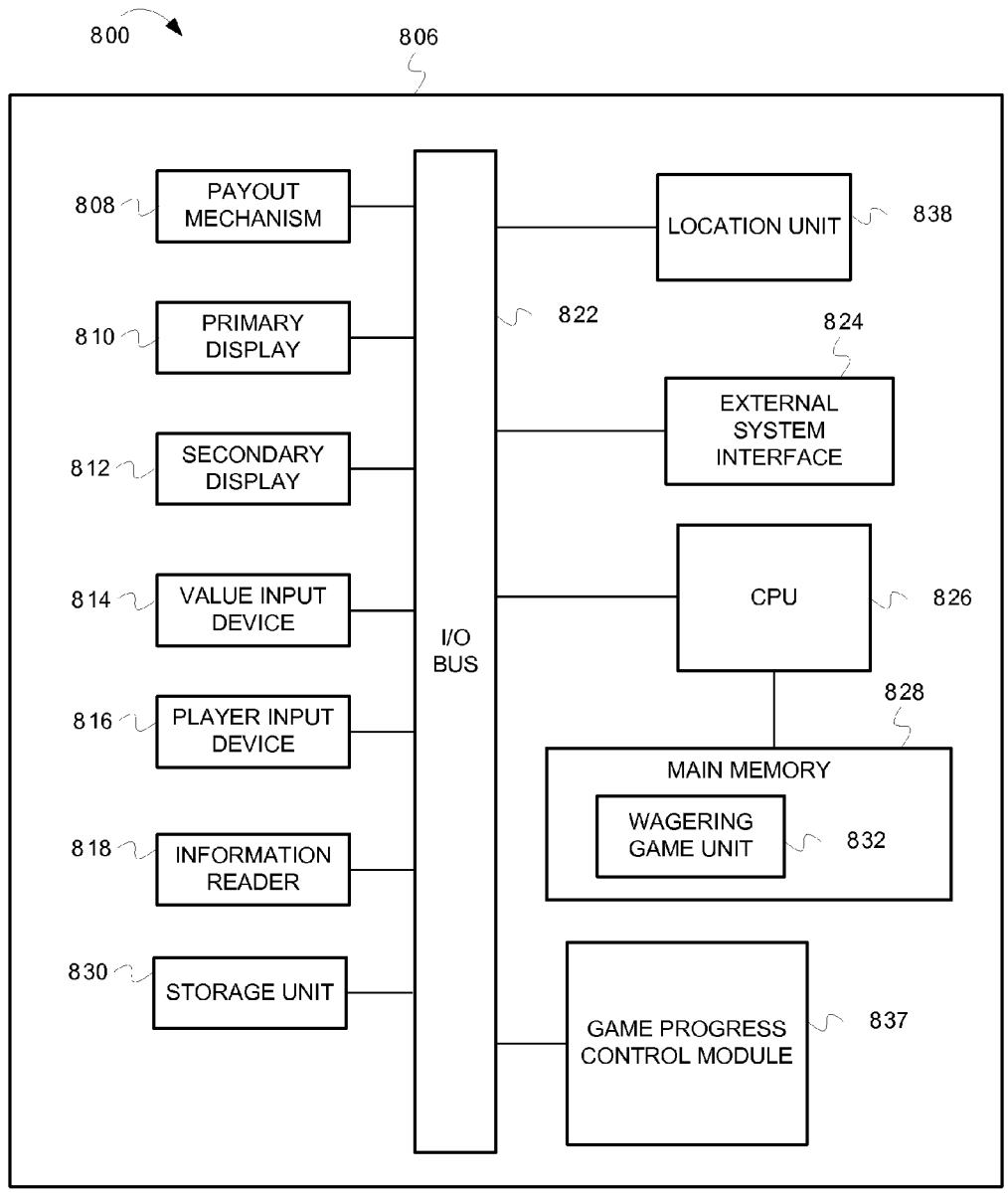
FIG. 8 is an illustration of a wagering game machine architecture 800, according to some embodiments.

FIG. 8 is a conceptual diagram that illustrates an example of a wagering game machine architecture 800, according to some embodiments. In FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In some embodiments, the wagering game unit 832 can present wagering games, such as video poker, video black jack, video slots, video lottery, reel slots, etc., in whole or part.

The CPU 826 is also connected to an input/output ("I/O") bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems (e.g., wagering game networks). The external system interface 824 can include logic for exchanging information over wired and wireless networks (e.g., 802.11g transceiver, Bluetooth transceiver, Ethernet transceiver, etc.)

The I/O bus 822 is also connected to a location unit 838. The location unit 838 can create player information that indicates the wagering game machine's location/movements in a casino. In some embodiments, the location unit 838 includes a global positioning system (GPS) receiver that can determine the wagering game machine's location using GPS satellites. In other embodiments, the location unit 838 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 8, in some embodiments, the location unit 838 is not connected to the I/O bus 822.

In some embodiments, the wagering game machine 806 can include additional peripheral devices and/or more than one of each component shown in FIG. 8. For example, in some embodiments, the wagering game machine 806 can include multiple external system interfaces 824 and/or multiple CPUs 826. In some embodiments, any of the components can be integrated or subdivided.

In some embodiments, the wagering game machine 806 includes a game progress control module 837. The game progress control module 837 can process communications, commands, or other information, where the processing can control progress in wagering games.

Furthermore, any component of the wagering game machine 806 can include hardware, firmware, and/or machine-readable media including instructions for performing the operations described herein.

Mobile Wagering Game Machine

Figure 9:
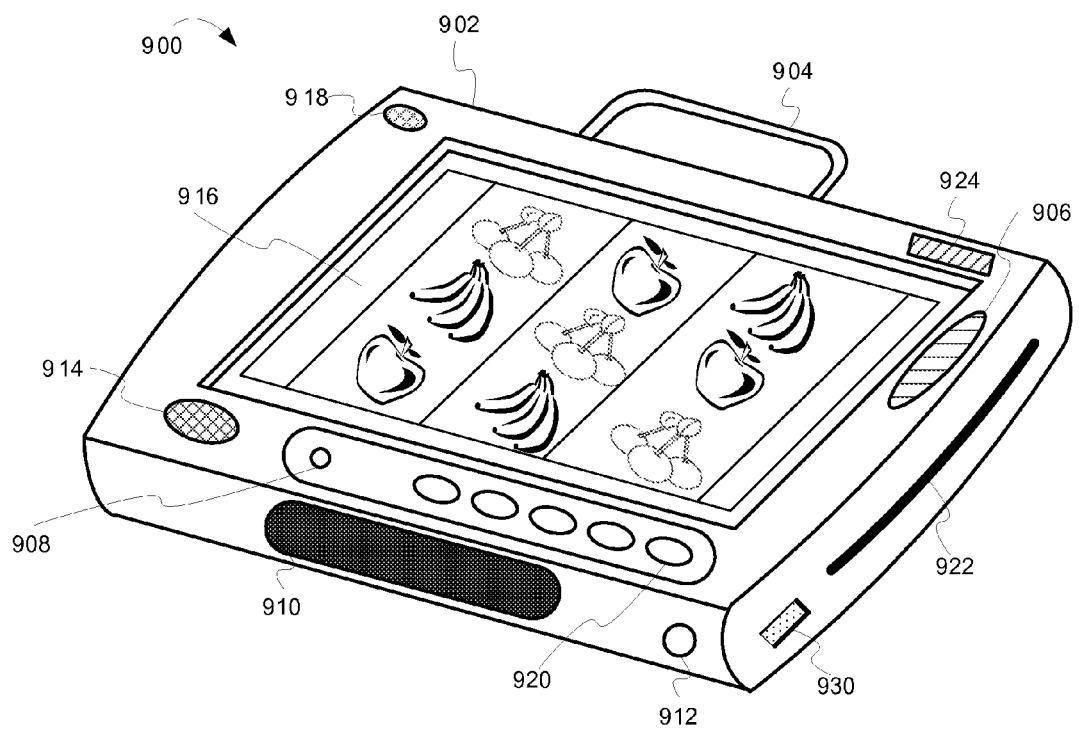
FIG. 9 is an illustration of a mobile wagering game machine 900, according to some embodiments.

FIG. 9 is a conceptual diagram that illustrates an example of a mobile wagering game machine 900, according to some embodiments. In FIG. 9, the mobile wagering game machine 900 includes a housing 902 for containing internal hardware and/or software such as that described above vis-à-vis FIG. 8. In some embodiments, the housing has a form factor similar to a tablet PC, while other embodiments have different form factors. For example, the mobile wagering game machine 900 can exhibit smaller form factors, similar to those associated with personal digital assistants. In some embodiments, a handle 904 is attached to the housing 902. Additionally, the housing can store a foldout stand 910, which can hold the mobile wagering game machine 900 upright or semi-upright on a table or other flat surface.

The mobile wagering game machine 900 includes several input/output devices. In particular, the mobile wagering game machine 900 includes buttons 920, audio jack 908, speaker 914, display 916, biometric device 906, wireless transmission devices (e.g., wireless communication units 912 and 924), microphone 918, and card reader 922. Additionally, the mobile wagering game machine can include tilt, orientation, ambient light, or other environmental sensors.

In some embodiments, the mobile wagering game machine 900 uses the biometric device 906 for authenticating players, whereas it uses the display 916 and the speaker 914 for presenting wagering game results and other information (e.g., credits, progressive jackpots, etc.). The mobile wagering game machine 900 can also present audio through the audio jack 908 or through a wireless link such as Bluetooth.

In some embodiments, the wireless communication unit 912 can include infrared wireless communications technology for receiving wagering game content while docked in a wager gaming station. The wireless communication unit 924 can include an 802.11G transceiver for connecting to and exchanging information with wireless access points. The wireless communication unit 924 can include a Bluetooth transceiver for exchanging information with other Bluetooth enabled devices.

In some embodiments, the mobile wagering game machine 900 is constructed from damage resistant materials, such as polymer plastics. Portions of the mobile wagering game machine 900 can be constructed from non-porous plastics which exhibit antimicrobial qualities. Also, the mobile wagering game machine 900 can be liquid resistant for easy cleaning and sanitization.

In some embodiments, the mobile wagering game machine 900 can also include an input/output ("I/O") port 930 for connecting directly to another device, such as to a peripheral device, a secondary mobile machine, etc. Furthermore, any component of the mobile wagering game machine 900 can include hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:
    determining that a progression requirement for a persistent-state game is fulfilled via wagering game activity, wherein the progression requirement is one of a plurality of progression requirements for the persistent-state game;
    associating a progression data unit with a wagering game player account, wherein the progression data unit represents fulfillment of the progression requirement; and
    providing a progression marker for presentation on a depiction of a path of progression, wherein the progression marker corresponds to the progression data unit, and wherein the path of progression indicates fulfillment of one or more of the plurality of progression requirements.

2. The computer-implemented method of claim 1 further comprising:
    determining that presentation of the progression marker completes a game objective requirement of the persistent-state game; and
    providing a game objective attainment marker for presentation at a location on the depiction of the path that corresponds to the progression marker, wherein the game objective attainment marker is a different type of marker than the progression marker.

3. The computer-implemented method of claim 2 further comprising:
    providing episodic content for presentation at the location on the depiction of the path of progression that corresponds to the game objective attainment marker, wherein the episodic content includes an episode from a plurality of episodes of a storyline, wherein each of the plurality of the episodes corresponds to a separate position on the depiction of the path of progression.

4. The computer-implemented method of claim 1 further comprising:
    setting a progression limit for the persistent-state game after determining that the progression requirement is fulfilled via the wagering game activity, wherein the progression limit restricts additional progress for the persistent-state game during a wagering game session in which the progression requirement was fulfilled.

5. The computer-implemented method of claim 1 further comprising:
    unlocking content associated with the persistent-state game in response to determining that the progression requirement is fulfilled via the wagering game activity.

6. The computer-implemented method of claim 5 further comprising:
    determining a request to access the content from a social contact associated with the wagering game player account; and
    providing access to the content by the social contact in response to detecting authorization via the wagering game player account.

7. One or more non-transitory, machine-readable storage media having instructions stored thereon, which when executed by a set of one or more processors causes the set of one or more processors to perform operations comprising:
    providing, for presentation, a non-wagering game associated with a persistent-state game, wherein the persistent-state game has reached a progression limit that restricts progression of the persistent-state game via wagering-game play until a game goal for the persistent-state game is completed through game play of the non-wagering game;
    determining that the game goal is completed through the game play of the non-wagering game; and
    removing the progression limit in the persistent-state game in response to the determining that the game goal is completed.

8. The one or more non-transitory, machine-readable storage media of claim 7 said operations further comprising:
    unlocking wagering game content in response to the determining that the game goal is completed.

9. The one or more non-transitory, machine-readable storage media of claim 8, wherein the non-wagering game is accessible external to a casino gaming network and wherein the wagering game content is accessible via the casino gaming network.

10. The one or more non-transitory, machine-readable storage media of claim 7, said operations further comprising:
    providing a progress marker for presentation on a graphical depiction of progress for the persistent-state game in response to the game play of the non-wagering game, wherein the progress marker indicates progress in the persistent-state game.

11. The one or more non-transitory, machine readable storage media of claim 10, said operations further comprising:
    providing a depiction of a path for presentation on the graphical depiction of the progress, wherein the depiction of the path indicates a sequence of progress through a plurality of depictions of game goal objectives for the persistent-state game that are attainable according to the sequence of progress; and
    providing the progress marker for presentation on the depiction of the path, wherein the operation for providing the progress marker for presentation on the depiction of the path triggers the determining that the game goal is completed through the game play of the non-wagering game.

12. A system comprising:
    one or more processors; and
    a game progress controller configured to, via at least one of the one or more processors,
        determine that a progression requirement, from a plurality of progression requirements for a persistent-state game, is fulfilled via wagering game activity,
        associate a progression data unit with a wagering game player account in response to the progression requirement being fulfilled, wherein the progression data unit is from a plurality of progression data units that indicate progress in the persistent-state game, and
        provide a progression marker for presentation on a depiction of a path, wherein the progression marker corresponds to the progression data unit, wherein one or more additional progression markers are positioned along the depiction of the path, wherein the one or more additional progression markers indicate one or more first states of progress for the persistent state game, and wherein the progression marker indicates a second state of progress in the persistent-state game subsequent to the one or more first states of progress.

13. The system of claim 12, wherein the game progress controller is further configured to
unlock content when the progression requirement is fulfilled via the wagering game activity.

14. The system of claim 12, wherein the persistent-state game comprises a plurality of episodes for a story line, and wherein the game progress controller is further configured to provide one or more of the plurality of episodes for presentation when the progression marker is presented on the depiction of the path.

15. The system of claim 12, wherein the game progress controller is further configured to:
determine that one or more additional progression requirements are fulfilled for the persistent-state game during online activity in response to player input, and
store additional progress data with the wagering game player account for the persistent-state game for the one or more additional progression requirements that are fulfilled.

16. The system of claim 12, wherein one or more of the graphical progression marker and at least one of the additional graphical progression markers indicates a game objective requirement of the persistent-state game.

17. An apparatus comprising:
a processor; and
a game progress control module configured to, via the processor,
determine that a progression requirement for a persistent-state game was fulfilled via non-wagering game activity in a non-wagering game, wherein the persistent-state game is configured to progress via both the non-wagering game activity and via wagering activity,
unlock wagering game content in response to the progression requirement being fulfilled,
detect a request to access the wagering game content, and
provide the wagering game content for presentation.

18. The apparatus of claim 17, wherein the game progress control module is further configured to
provide a wagering game for presentation, wherein the wagering game content is a wagering game feature for the wagering game, and wherein the wagering game feature was previously unavailable for the wagering game prior to being unlocked, and
provide access to the wagering game feature for the wagering game in response to the wagering game content being unlocked.

19. The apparatus of claim 17, wherein the game progress control module configured to unlock the wagering game content in response to the progression requirement being fulfilled is configured to,
access a wagering game player account,
access progression data stored with the wagering game player account, wherein the progression data was stored with the wagering game player account when the progression requirement for the persistent-state game was fulfilled via the non-wagering game activity, and
provide the wagering game content in response to the access of the progression data.

20. An apparatus comprising:
means for determining that a first progression requirement for a persistent-state game is fulfilled via wagering game activity;
means for unlocking access to a non-wagering game in response to the progression requirement being fulfilled; and
means for setting a progression limit for the persistent-state game in response to the first progression requirement being fulfilled via the wagering game activity, wherein the progression limit restricts progress for the persistent-state game until a second progression requirement is completed for the persistent-state game via access to the non-wagering game.

21. The apparatus of claim 20 further comprising:
means for providing a choice of the non-wagering game and one or more additional non-wagering games to unlock; and
means for determining a selection of the non-wagering game via user input.

22. The apparatus of claim 20 further comprising:
means for restricting access to the non-wagering game via a first wagering game venue, wherein the first wagering game venue presents the wagering game activity;
means for determining that the non-wagering game is accessed via a second wagering game venue;
means for determining that the second progression requirement is completed for the persistent-state game via access to the non-wagering game; and
means for removing the progression limit for the persistent-state game based on determination that the second progression requirement is completed.

23. The apparatus of claim 20 further comprising:
means for indicating the progression limit during a wagering game session; and
means for providing one or more progress markers for presentation on a progress chart for the persistent-state game.

24. The apparatus of claim 20 further comprising:
means for providing coded access to the non-wagering game.

25. The apparatus of claim 20 further comprising:
means for unlocking a level of access to the non-wagering game.

26. The apparatus of claim 20 further comprising:
means for determining that the second progression requirement is completed for the persistent-state game via play of the non-wagering game;
means for unlocking wagering game content; and
means for setting an additional progression limit for the persistent-state game in response to the second progression requirement being completed via the play in the non-wagering game, wherein the additional progression limit restricts additional progress for the persistent-state game until one or more additional progression requirements are fulfilled via additional wagering game activity.

* * * * *